United States Patent
Chang

(10) Patent No.: US 6,805,151 B1
(45) Date of Patent: Oct. 19, 2004

(54) VALVE SEATS AND A CERAMIC CONTROL VALVE OF A FAUCET

(76) Inventor: Chia-Bo Chang, No. 335, Chang-Ting Rd., Lukang, Changhua Hsien (TW)

(*) Notice: Subject to any disclaimer, the term of this patent is extended or adjusted under 35 U.S.C. 154(b) by 225 days.

(21) Appl. No.: 10/270,203

(22) Filed: Oct. 15, 2002

(51) Int. Cl.$^7$ .............................................. F16K 11/06
(52) U.S. Cl. .................................. 137/270; 137/625.41
(58) Field of Search .............................. 137/269, 270, 137/271, 625.41, 625.17

(56) References Cited

U.S. PATENT DOCUMENTS

| | | | | |
|---|---|---|---|---|
| 3,674,048 A | * | 7/1972 | Manoogian et al. | 137/270 |
| 4,022,242 A | * | 5/1977 | Turecek | 137/270 |
| 4,243,063 A | * | 1/1981 | Parkison | 137/625.41 |
| 4,397,330 A | * | 8/1983 | Hayman | 137/270 |
| 4,423,752 A | * | 1/1984 | Psarouthakis | 137/625.41 |
| 4,584,723 A | * | 4/1986 | Hussauf | 137/270 |
| 4,609,007 A | * | 9/1986 | Uhl | 137/270 |
| 4,901,749 A | * | 2/1990 | Hutto | 137/270 |
| 5,095,934 A | * | 3/1992 | Iqbal | 137/270 |
| 5,425,394 A | * | 6/1995 | Clare | 137/270 |
| 5,725,010 A | * | 3/1998 | Marty et al. | 137/100 |
| 5,806,552 A | * | 9/1998 | Martin, Jr. | 137/270 |
| 5,893,386 A | * | 4/1999 | Caria et al. | 137/271 |
| 6,123,105 A | * | 9/2000 | Yang | 137/625.41 |
| 6,640,357 B1 | * | 11/2003 | Chang | 137/625.41 |

* cited by examiner

Primary Examiner—John Rivell
(74) Attorney, Agent, or Firm—Charles E. Baxley

(57) ABSTRACT

A faucet includes two valve seats back-to-back, and a ceramic control valve assembled with an assembly slot of the two valve seats. The assembly slot is provided on a central horizontal line thereof with a cold water guide bole and a hot water guide hole, and on a central vertical line thereof with an upper discharging hole and a lower discharging hole. A base of the ceramic control valve is provided on a central horizontal line thereof with a cold water admission hole, and a hot water admission hole. The base is further provided with a water discharging hole which is located across a central vertical line of the base such that the water discharging hole is opposite in location to the lower discharging hole of the assembly slot. The base is provided with a water stopping surface located on the central vertical line of the base.

2 Claims, 13 Drawing Sheets

VALVE SEATS AND A CERAMIC CONTROL VALVE OF A FAUCET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a faucet, and more particularly to two valve seats and a ceramic control valve of the faucet. The two valve seats are mounted in a back-to-back manner in conjunction with the ceramic control valve, thereby enabling the cold water to let out first whenever the faucet is opened.

BACKGROUND OF THE INVENTION

As shown in FIG. 12, a prior art faucet comprises two valve seats 30 and 301, which are mounted in a back-to-back manner that the two valve seats 30 and 301 are in communication with a cold water pipe 31 and a hot water pipe 32, and that the two valve seats 30 and 301 are corresponding in location to the water duct of the ceramic control valve 33. The valve seats 30 and 301 have a water-discharging hole 34, which is located along with a cold water guide hole 35 and a hot water guide hole 36 in a triangular manner, as shown in FIG. 13. These three holes 34, 35 and 36 are so arranged that they conform to the arrangement pattern of the water-discharging hole 37, the cold water guide hole 38, and the hot water guide hole 39 of the ceramic control valve 33.

In operation, when the valve knob 40 of the ceramic control valve 33 is turned, the cold water duct is first opened so as to prevent a user from being burned by the hot water under the circumstances that the ceramic control valve 33 is assembled with the valve seat 30 located in an outer wall 41. However, when the ceramic control valve 33 is assembled with the valve seat 301 located in an inner wall 42, the hot water is first let out.

BRIEF SUMMARY OF THE INVENTION

The primary objective of the present invention is to provide a faucet with valve seats and a ceramic control valve, which are free of the deficiencies of the prior art faucet described above.

The two valve seats of the present invention are provided in an assembly slot with a cold water guide hole and a hot water guide hole, which are located correspondingly on a central horizontal line of the assembly slot. The ceramic control valve is provided with a cold water inlet, and a hot water inlet, which are located correspondingly on a central horizontal line of a base of the ceramic control valve. The base of the ceramic control valve is provided with a water outlet cooperative with a lower hole of the assembly slot of the valve seat. As the ceramic control valve is assembled with the valve seat located in a real wall, the cold water is always let out first.

DETAILED DESCRIPTION OF THE INVENTION

Figure 1:
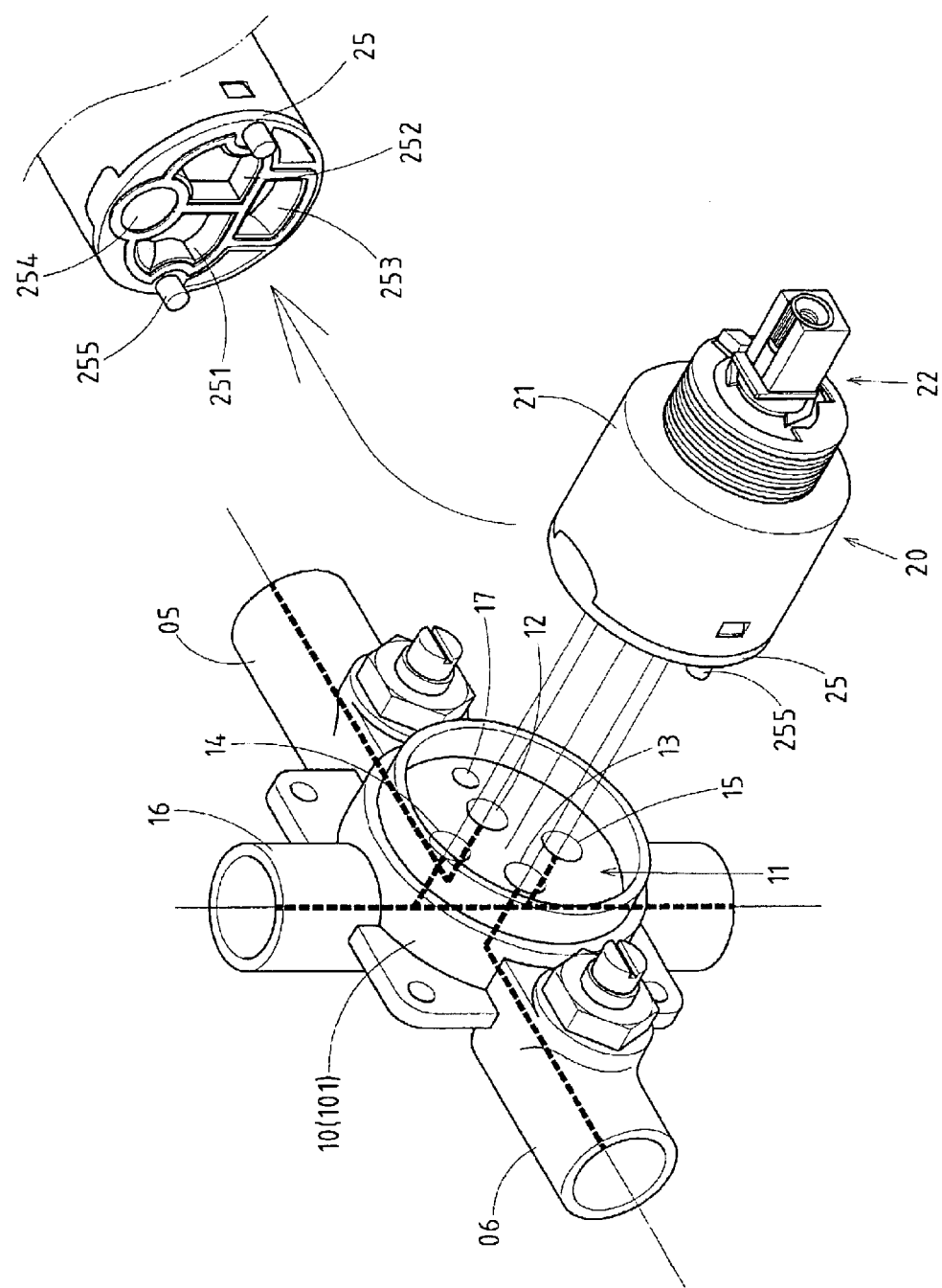
FIG. 1 shows an exploded perspective view of the present invention.

As shown in FIGS. 1–5, a faucet embodied in the present invention comprises a front valve seat 10, a rear valve seat 101, and a ceramic control valve 20.

The valve seats 10 and 101 are mounted back to back in a wall such that an assembly slot 11 of the valve seats 10 and 101 juts out of a front side 01 and a rear side 02 of the wall. The assembly slot 11 is provided with a cold water guide hole 12, a hot water guide hole 13, an upper discharging hole 14 and a lower discharging hole 15. The holes 14 and 15 are connected with a longitudinal pipe 16 which is in turn connected at the top thereof with a shower head, and at the bottom thereof with a faucet.

Figure 2:
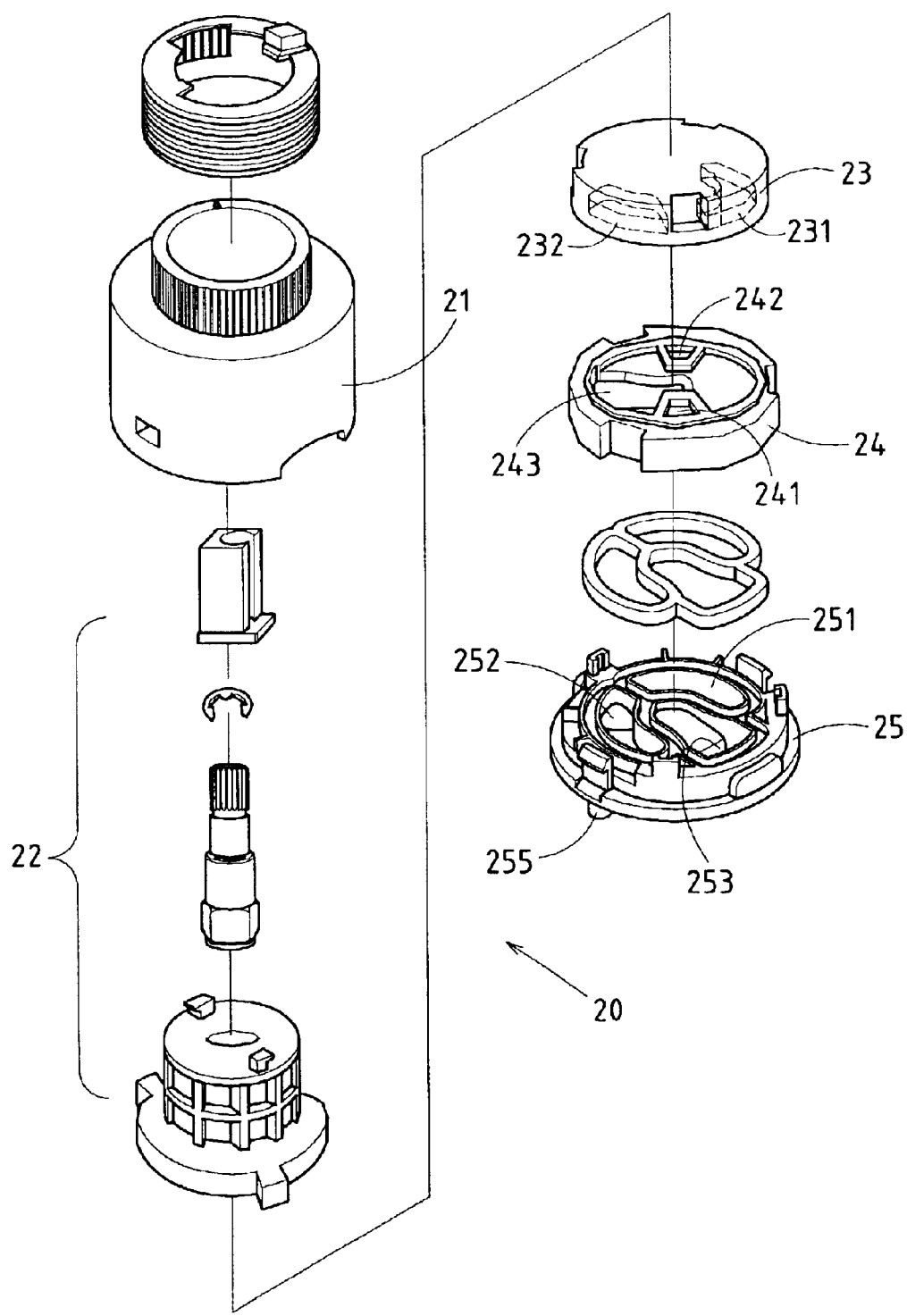
FIG. 2 shows an exploded perspective view of the ceramic control valve of the present invention.

As shown in FIG. 2, the ceramic control valve 20 is formed of a housing 21, a rotating member 22, a water control block 23, a water distribution seat 24, and a base 25. The water control block 23 is provided with a first water slot 231 and a second water slot 232. The water distribution seat 24 is provided with a cold water admission hole 241, a hot water admission hole 242, and a water discharging hole 243. The base 25 is disposed airtightly in the bottom of the housing 21 and is provided with a cold water admission hole 251 corresponding in location to the cold water admission hole 241 of the water distribution seat 24, a hot water admission hole 252 corresponding in location to the hot water admission hole 242 of the water distribution seat 24, and a water discharging hole 253 corresponding in location to the water discharging hole 243 of the water distribution seat 24. The water control block 23 is actuated by the rotating member 22 to regulate the flow of the cold water and the flow of the hot water.

Figure 3:
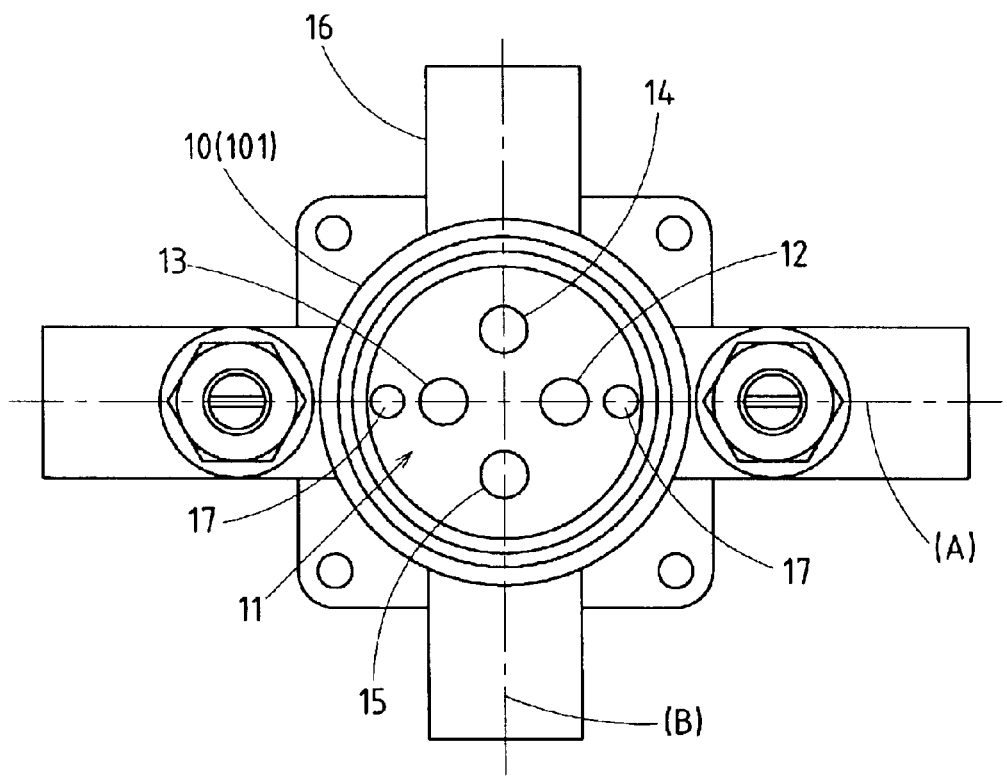
FIG. 3 shows a front view of the valve seat of the present invention.

As shown in FIG. 3, the cold water guide hole 12 and the hot water guide hole 13 of the assembly slot 11 of the valve seats 10 and 101 are located correspondingly on a central horizontal line "A" of the assembly slot 11. The upper discharging hole 14 and the lower discharging hole 15 of the assembly slot 11 are located correspondingly on a central vertical line "B" of the assembly slot 11. The holes 14 and 15 are in communication with the longitudinal pipe 16 of the valve seats 10 and 101, as shown in FIG. 1.

Figure 4:
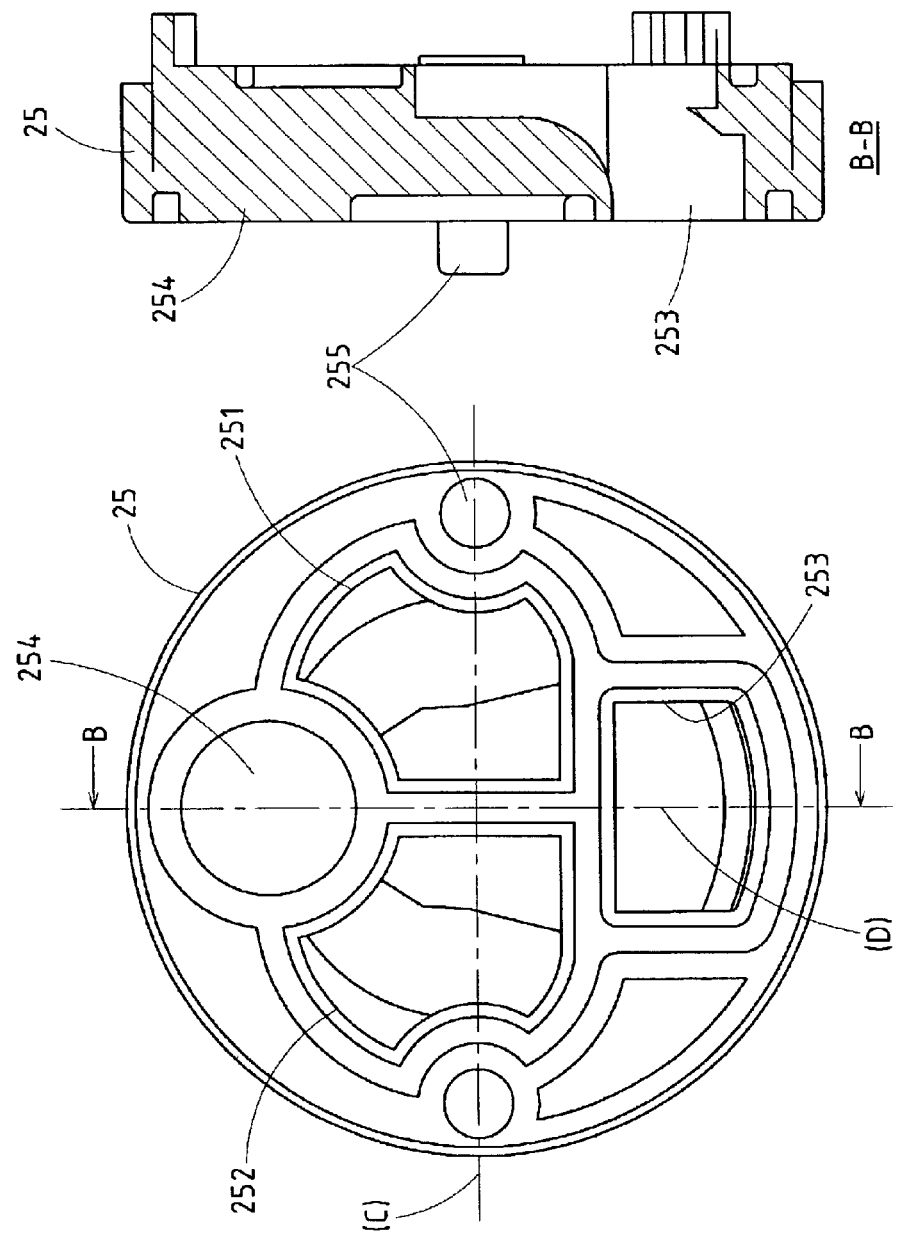
FIG. 4 shows a plan view and a sectional view of the base of the ceramic control valve of the present invention.

As shown in FIGS. 1 and 4, the cold water admission hole 251 and the hot water admission hole 252 of the base 25 are located correspondingly on a central horizontal line "C" of the base 25. The water discharging hole 253 of the base 25 is located across a central vertical line "D" of the base 25 such that the hole 253 is opposite to the lower discharging hole 15. A water stopping surface 254 of the base 25 is located on the central vertical line "D" of the base 25 such that the surface 254 is opposite to the water discharging hole 253 of the base 25.

As shown in FIGS. 3 and 4, the base 25 of the ceramic control valve 20 is provided in the underside with a plurality of projections 255. The assembly slot 11 of the valve seats 10 and 101 is provided with a plurality of locating slots 17 corresponding in location and number to the projections 255. The ceramic control valve 20 is located by the projections 225 which are retained in the locating slots 17.

Figure 5:
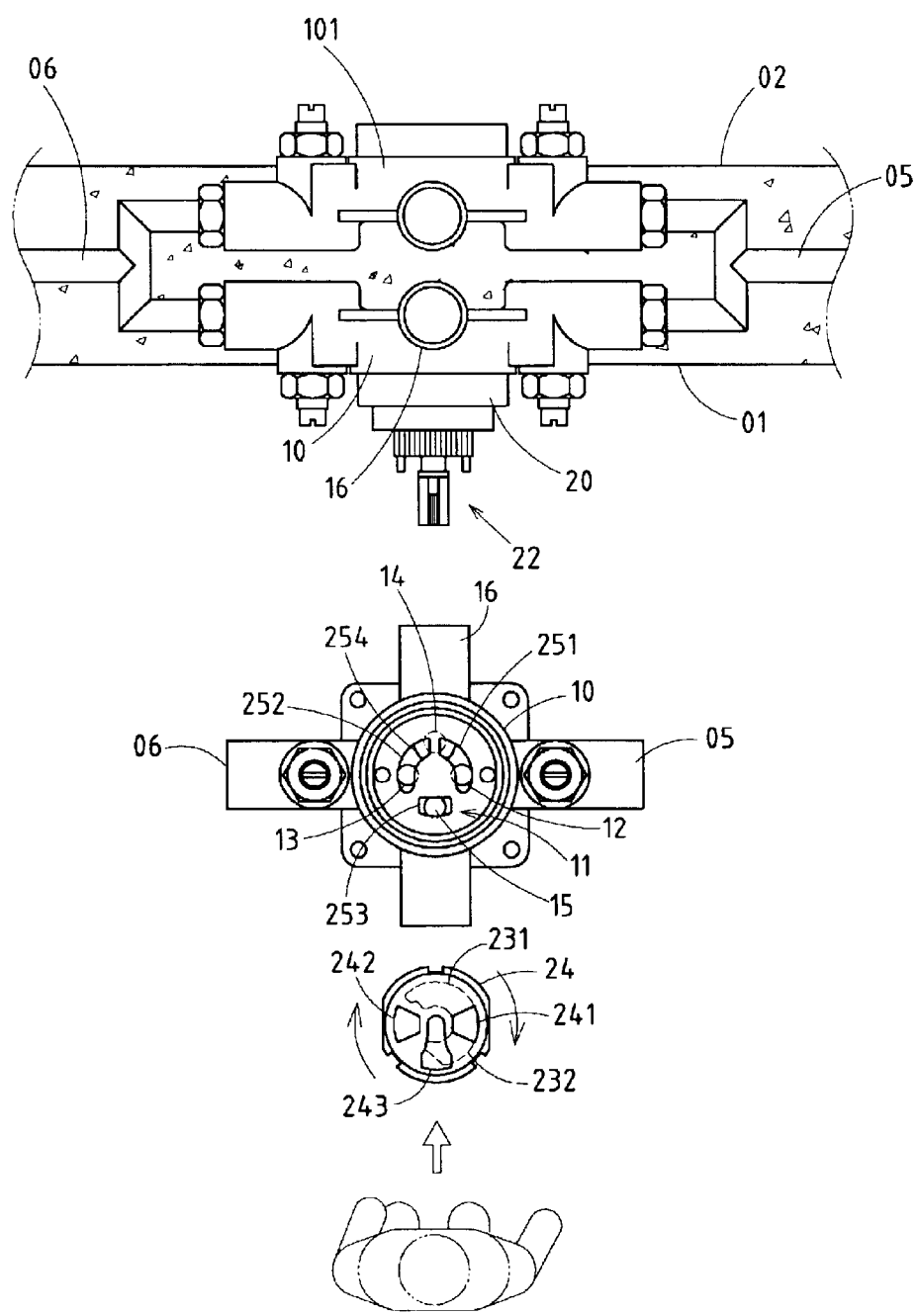
FIG. 5 shows a schematic view of a valve seat of the present invention being mounted in a front wall such that the ceramic control valve is assembled with the valve seat, with the top drawing showing the cross section of the valve seat and the wall, with the middle drawing showing the front view of the base and the valve seat, and with the bottom drawing showing the relationship between the water control block and the water distribution seat.
Figure 6:
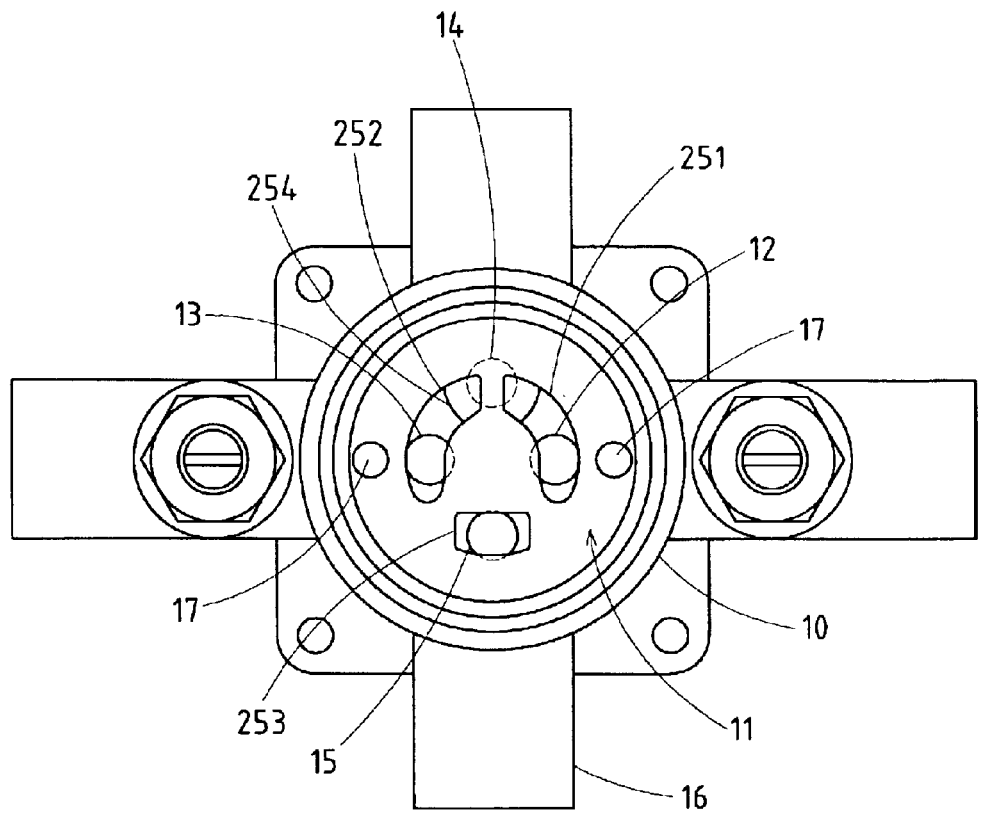
FIG. 6 shows a schematic view of the closed flow path of the present invention.
Figure 6:
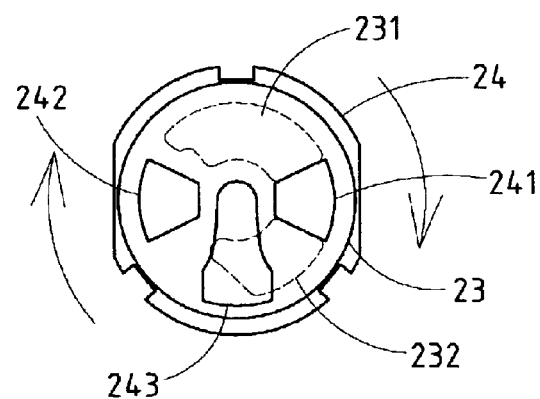

As shown in FIGS. 1 and 5, when the ceramic control valve 20 is assembly with the front valve seat 10 located in the front side 01 of a wall, the cold water admission hole 251 and the hot water admission hole 252 of the base 25 of the ceramic control valve 20 are respectively joined with the cold water guide hole 12 and the hot water guide hole 13 of the assembly slot 11 of the front valve seat 10. The water discharging hole 253 of the base 25 is joined with the lower discharging hole 15 of the assembly slot 11 of the front valve seat 10. The water stopping surface 254 of the base 25 is airtightly joined with the upper discharging hole 14 of the assembly slot 11 of the front valve seat 10.

Figure 7:
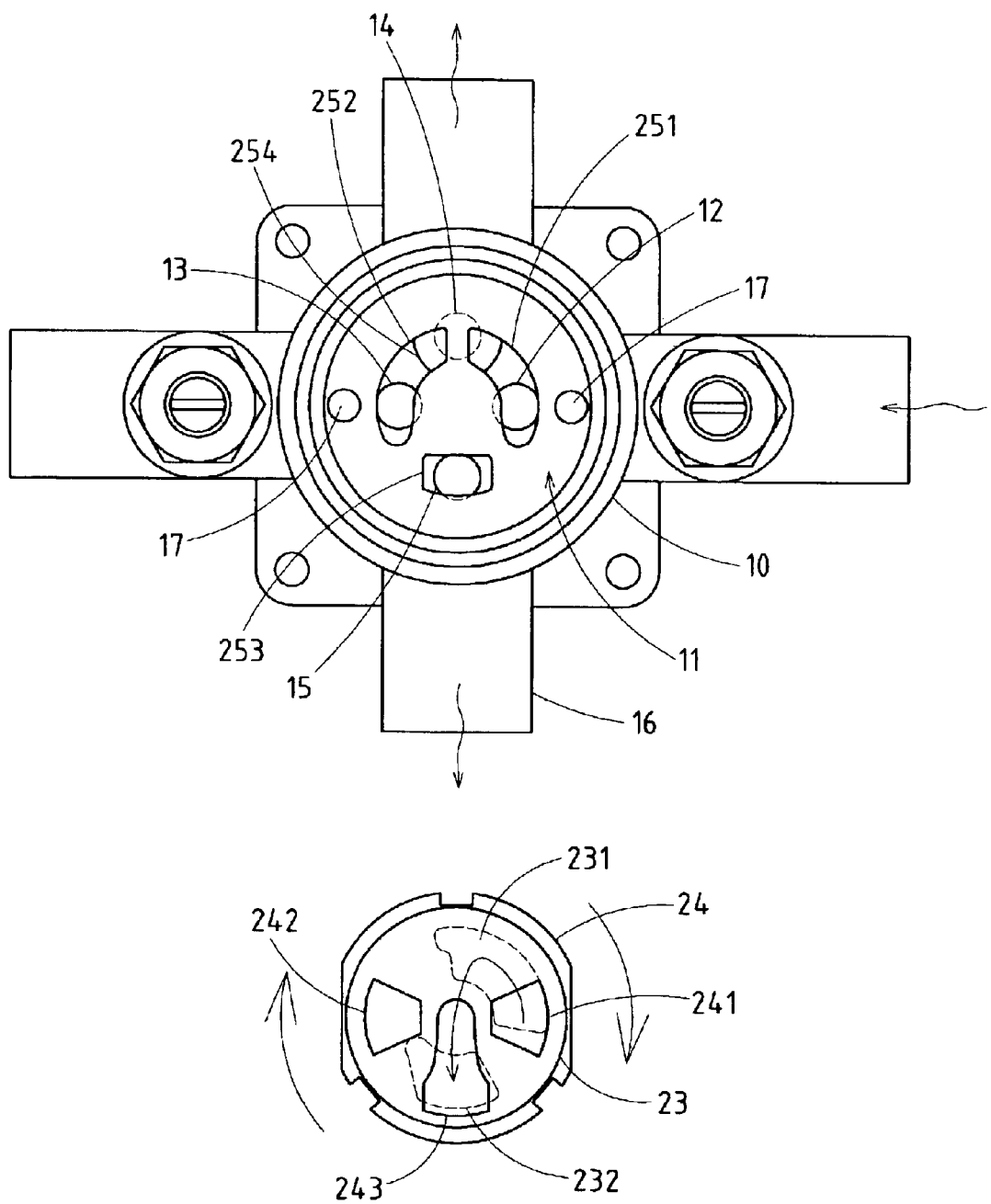
FIG. 7 shows a schematic view of the cold water supply of the present invention.
Figure 8:
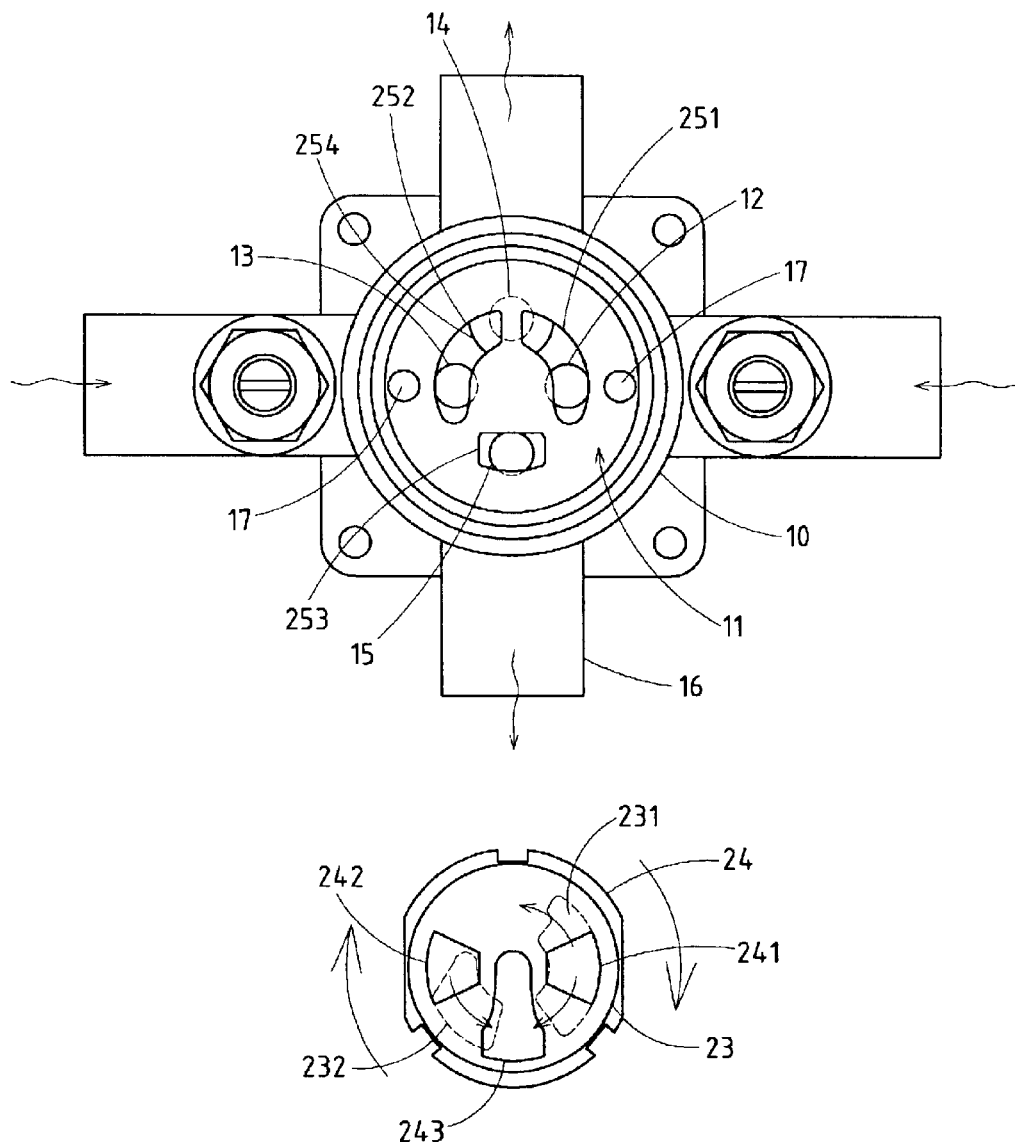
FIG. 8 shows a schematic view of the simultaneous supply of cold water and hot water of the present invention.
Figure 9:
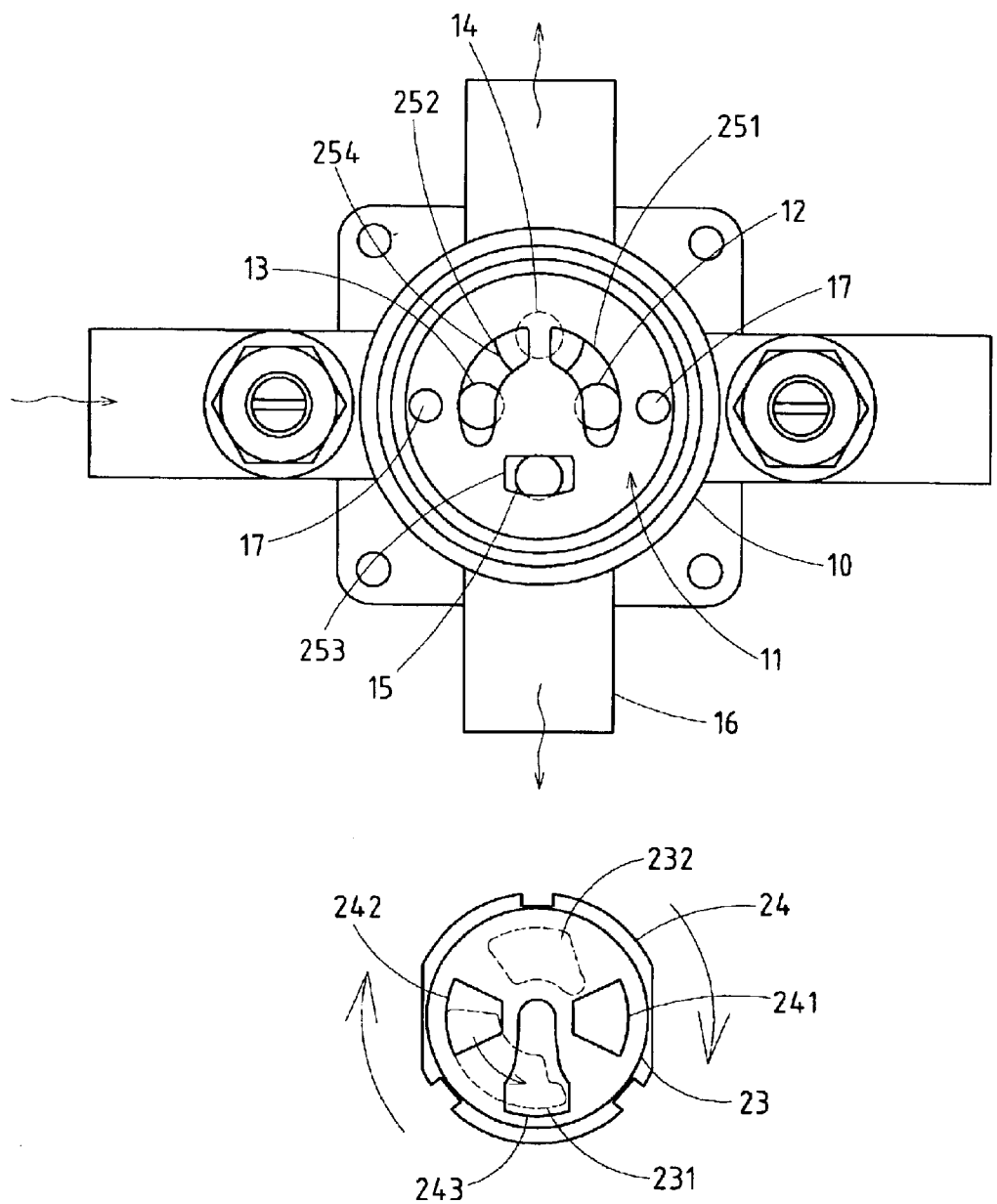
FIG. 9 shows a schematic view of the hot water supply of the present invention.

As shown in FIGS. 6, 7, 8, and 9, when the water control block 23 of the ceramic control valve 20 is turned, the first water slot 231 and the second water slot 232 of the water control block 23 are caused to displace in relation to the cold water admission hole 241, the hot water admission hole 242, and the water discharging hole 243 of the water distribution seat 24, thereby resulting in the first-out of the cold water, as shown in FIG. 7, and then the simultaneous outflows of the cold water and the hot water, as shown in FIG. 8. The simultaneous outflows are followed by an exclusive outflow of the hot water, as shown in FIG. 9.

Figure 10:
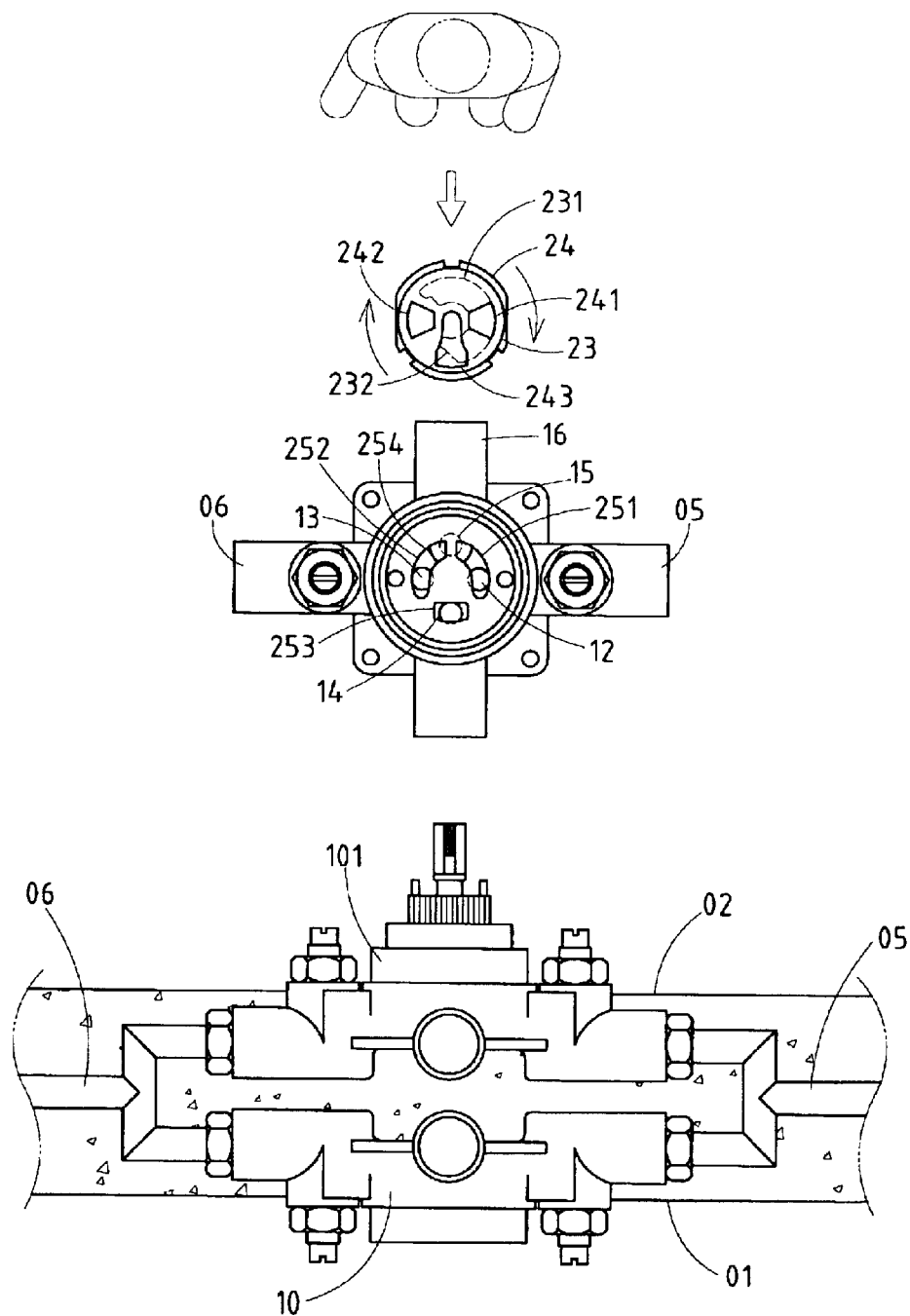
FIG. 10 shows a schematic view of the assembly of the ceramic control valve of the present invention with the valve seat located in the rear wall, with the top and the bottom drawings being opposite to those of FIG. 5, and with the middle drawing being the same as the middle drawing of FIG. 5.
Figure 11:
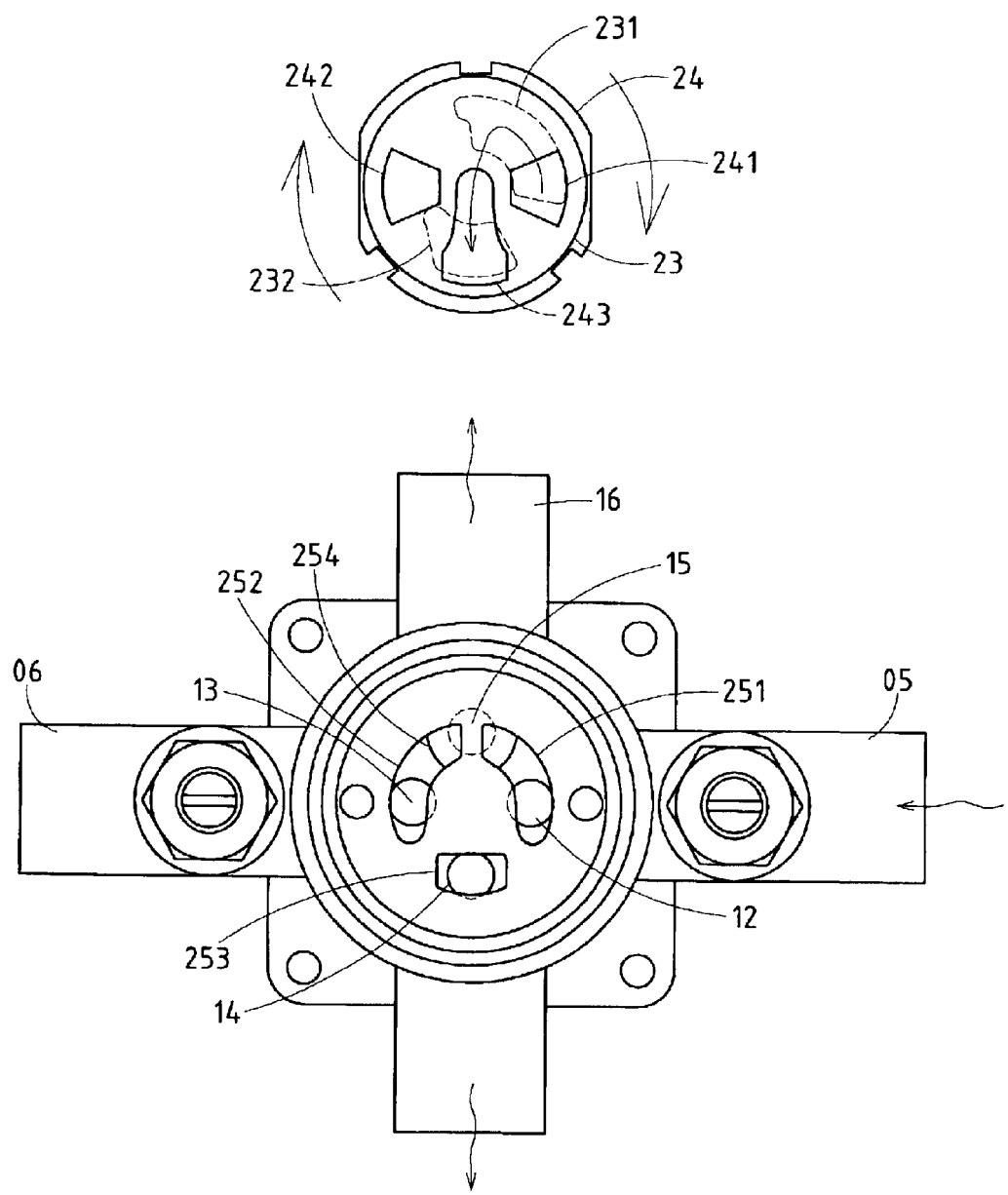
FIG. 11 shows a schematic view of the cold water supply at the time when the ceramic control valve of the present invention is in action.
Figure 12:
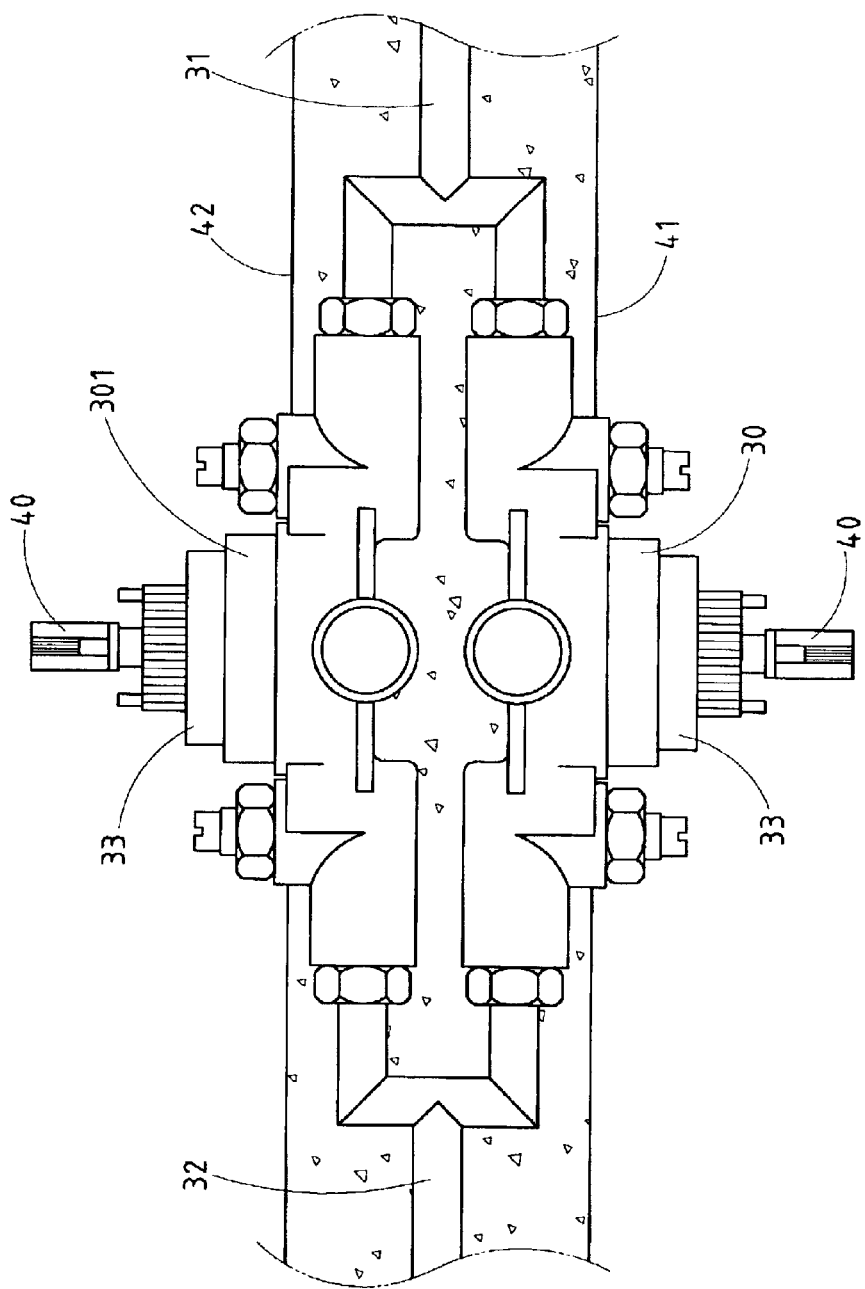
FIG. 12 shows a schematic view of a prior art faucet.
Figure 13:
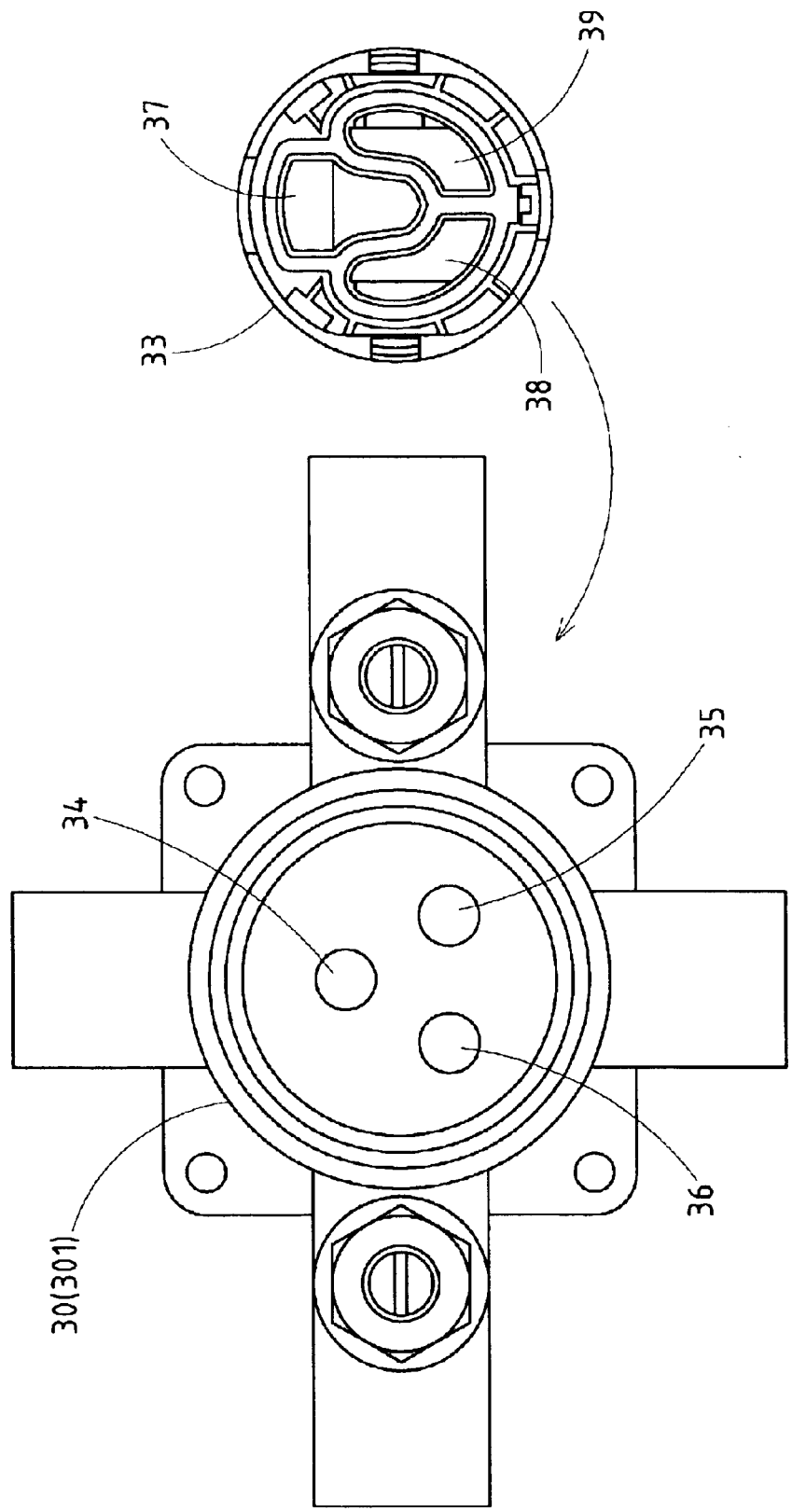
FIG. 13 shows another schematic view of the prior art faucet.

As shown in FIG. 10, the ceramic control valve 20 is to be assembled with the rear valve seat 101 located in the rear side 02 of the wall, the ceramic control valve 20 is turned an angle of 180 degrees before the ceramic control valve 20 is assembled with the rear valve seat 101. As a result, the cold water admission hole 251, the hot water admission hole 252 of the base 25 of the ceramic control valve 20 are joined with the cold water guide hole 12 and the hot water guide hole 13 of the assembly slot 11 of the rear valve seat 101. In the meantime, the water discharging hole 253 of the base 25 is joined with the upper discharging hole 14 of the rear valve seat 101. The water stopping surface 254 of the base 25 is airtightly joined with the lower discharging hole 15 of the assembly slot 11. The working mechanism of the ceramic control valve 20 in relation to the rear valve seat 101 is identical to that of the ceramic control valve 20 in relation to the front valve seat 10 as described above with reference to FIGS. 6–9.

The present invention described above is to be regarded in all respects as being illustrative and nonrestrictive. Accordingly, the present invention may be embodied in other specific forms without deviating from the spirit thereof The present invention is therefore to be limited only by the scope of the following claims.

I claim:
1. A faucet comprising:
   a front valve seat and a rear valve seat mounted with said front valve scat in a back-to-back manner to form an assembly slot which is comprised of a cold water guide hole, a hot water guide hole, an upper discharging hole, and a lower discharging hole, with said upper discharging hole and said lower discharging hole being connected with a longitudinal pipe; and
   a ceramic control valve assembled with said assembly slot and comprised of a housing, a rotating member, a water control block, a water distribution seat, and a base, said water control block being comprised of a first water slot and a second water slot, said water distribution seat being comprised of a cold water admission hole, a hot water admission hole, and a water discharging hole, said base being airtightly disposed at a bottom of said housing and comprised of a cold water admission hole corresponding in location to said cold water admission hole of said water distribution seat, a hot water admission hole corresponding in location to said hot water admission hole of said water distribution seat, and a water discharging hole corresponding in location to said water discharging hole of said water distribution seat, said rotating member serving to actuate said water control block to regulate flow of cold water and hot water, said base being further comprised of a water stopping surface;
   wherein said cold water guide hole and said hot water guide hole of said assembly slot of said front valve seat and said rear valve scat are located on a central horizontal line of said assembly slot, said upper discharging hole and said lower discharging hole of said assembly slot being located on a central vertical line of said assembly slot;
   wherein said cold water admission hole and said hot water admission hole of said base of said ceramic control valve are located on a central horizontal line of said base, with said water discharging hole of said base being located across a central vertical line of said base such that said water discharging hole is opposite in location to said lower discharging hole of said assembly slot, said water stopping surface of said base being located on the central vertical line of said base such that said water stopping surface is opposite in location to said water discharging hole of said base.

2. The faucet as defined in claim 1, wherein said assembly slot is comprised of a plurality of locating slots; wherein said base of said ceramic control valve is comprised of, in an underside, a plurality of locating projections corresponding in location and number to said locating slots of said assembly slot whereby said ceramic control valve is assembled with said assembly slot such that said locating projections of said base of said ceramic control valve are retained in said locating slots of said assembly slot.

* * * * *